No. 833,173. PATENTED OCT. 16, 1906.
D. T. OWEN.
COMBINED BED AND COUCH.
APPLICATION FILED OCT. 8, 1904.
4 SHEETS—SHEET 1.
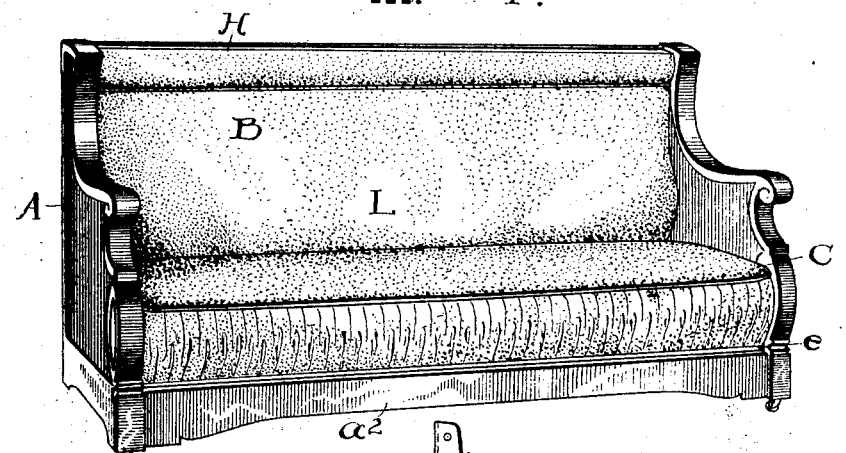
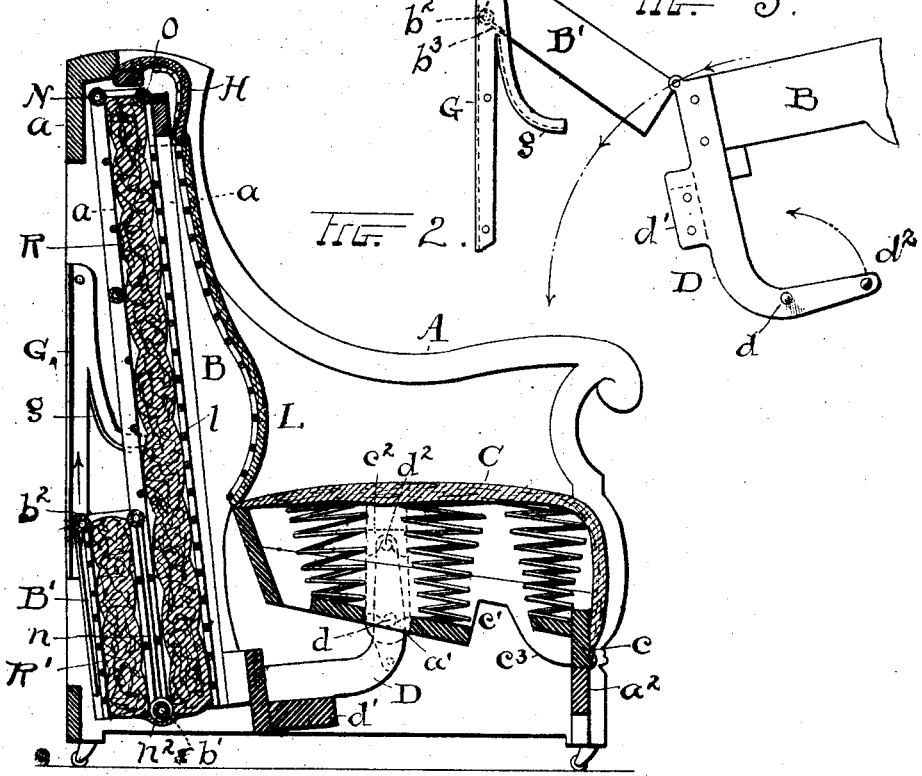
ATTEST.
INVENTOR.
David T. Owen
By H. J. Fisher
ATTY.

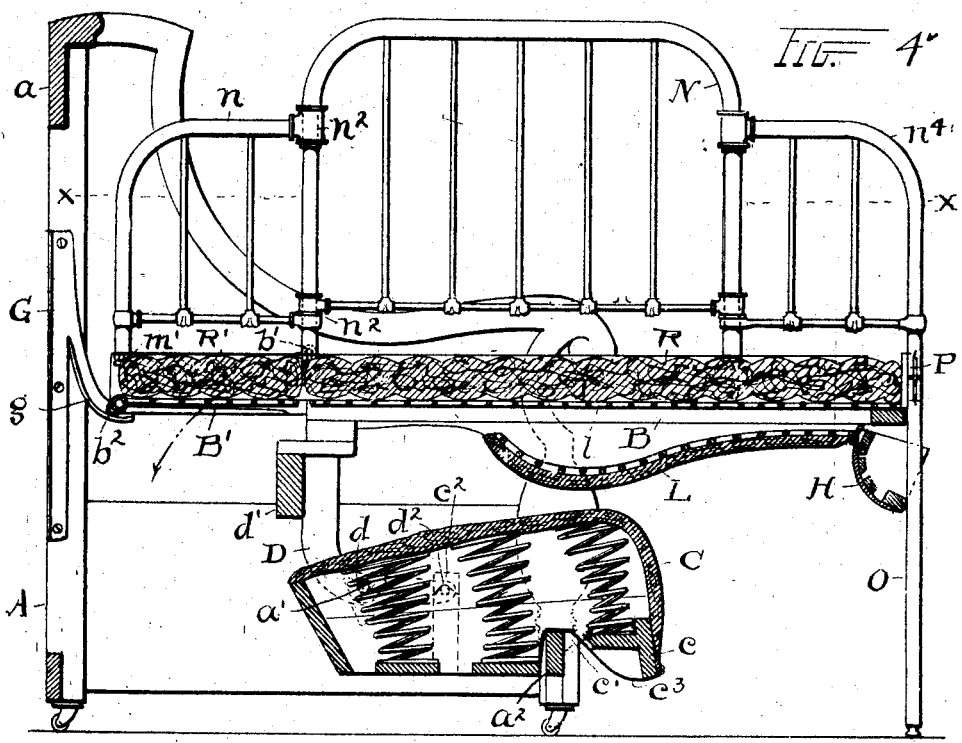
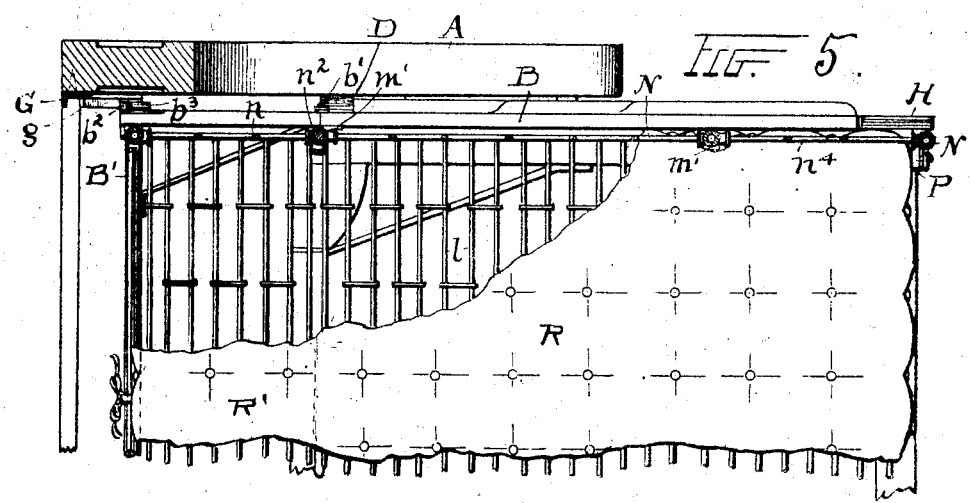

No. 833,173. PATENTED OCT. 16, 1906.
D. T. OWEN.
COMBINED BED AND COUCH.
APPLICATION FILED OCT. 8, 1904.

4 SHEETS—SHEET 3.

ATTEST
INVENTOR.
David T. Owen
BY H. J. Fisher
ATTY.

No. 833,173. PATENTED OCT. 16, 1906.
D. T. OWEN.
COMBINED BED AND COUCH.
APPLICATION FILED OCT. 8, 1904.
4 SHEETS—SHEET 4.
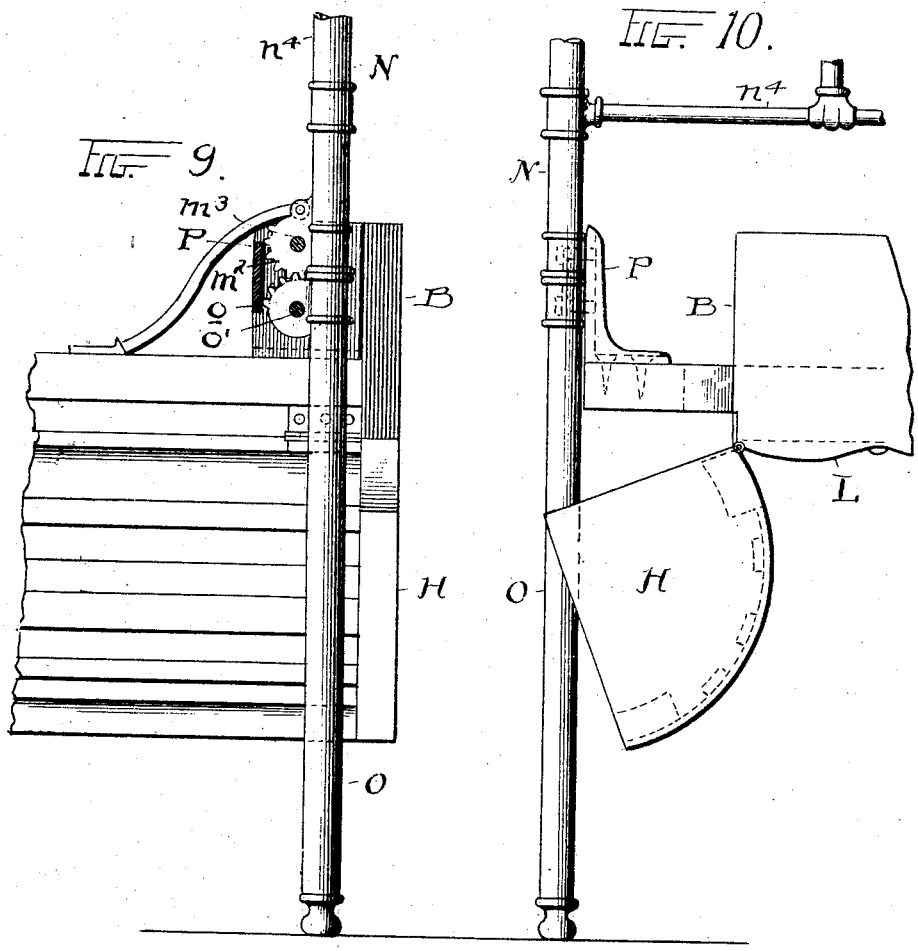
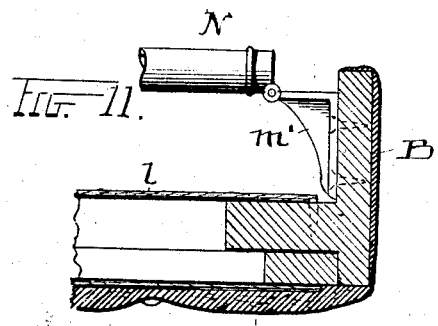
ATTEST.
INVENTOR.
David T. Owen
By H. J. Fisher
ATTY.

UNITED STATES PATENT OFFICE.

DAVID T. OWEN, OF CLEVELAND, OHIO, ASSIGNOR TO THE D. T. OWEN COMPANY, OF CLEVELAND, OHIO, A CORPORATION OF NEW JERSEY.

COMBINED BED AND COUCH.

No. 833,173.         Specification of Letters Patent.         Patented Oct. 16, 1906.

Application filed October 8, 1904. Serial No. 227,686.

*To all whom it may concern:*

Be it known that I, DAVID T. OWEN, a citizen of the United States, residing at Cleveland, in the county of Cuyahoga and State of Ohio, have invented certain new and useful Improvements in a Combined Bed and Couch; and I do declare that the following is a full, clear, and exact description of the invention, which will enable others skilled in the art to which it appertains to make and use the same.

My invention relates to a combined bed and couch; and the invention consists in the construction and combination of parts substantially as shown and described, and particularly pointed out in the claims.

Figure 6:
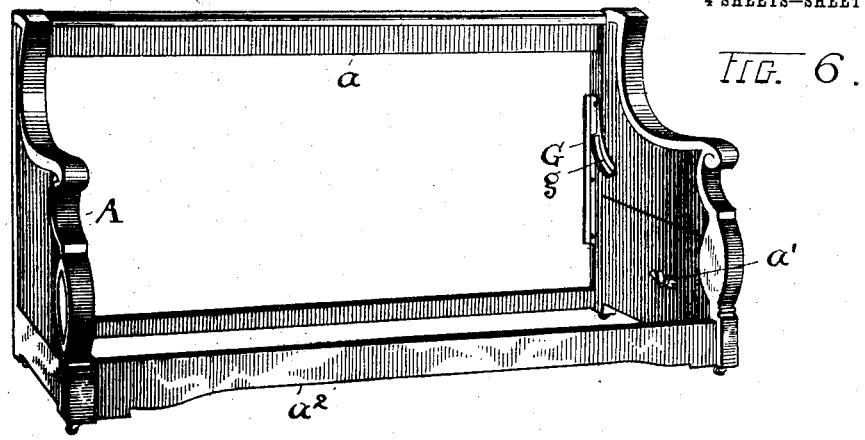
Figure 7:
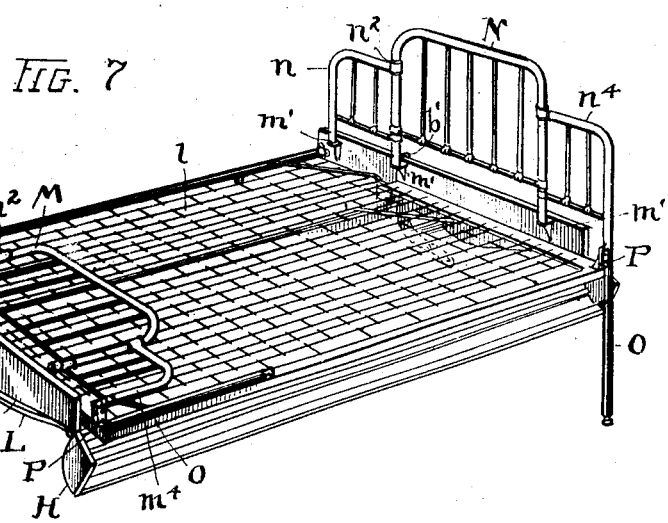
Figure 8:
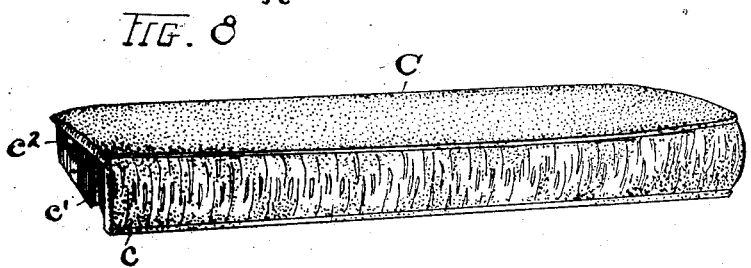

In the accompanying drawings, Figure 1 is a perspective view of the invention as it appears when converted into a couch or sofa, and Fig. 2 is an enlarged cross-section of Fig. 1. Fig. 3 is an end view of certain parts for swinging the rear section of the bed into open and folded positions, as hereinafter fully described. Fig. 4 is a cross-section of the parts shown as converted into a bed and with the couch-seat retired. Fig. 5 is a plan view on line *x x*, Fig. 4. Fig. 6 is a perspective view of the combined bed and couch frame alone, and Fig. 7 is a perspective view of the bed alone separated from its support and showing certain attached parts. Fig. 8 is a perspective view of the couch-seat alone. Fig. 9 is a front view, and Fig. 10 is a corresponding side view of one corner of the front portion of the bed and its leg-support. Fig. 11 is a cross-section of the bed alone on a line corresponding substantially to *a a*, Fig. 2.

The mechanism as thus shown is designed especially to afford a double bed of popular size in length and width—say six feet in length by four feet six inches in width—and adapted to be folded up and hidden from sight within a couch embodiment of the usual proportions and which to all appearance is a massive "davenport," having all its proportions in harmony.

To these ends the invention comprises a main frame A of the couch pattern, a bed or bed-frame B, and a couch-seat C, both of which parts are movable and mutually accommodating according as one or the other is used. When the bed is used, the couch-seat is lowered out of the way and out of sight beneath the bed, and when the couch is used the bed is folded, and its specially-finished bottom forms the back of the couch. This in itself is not broadly new in this construction, as it is more or less fully shown in prior patents granted to me.

Now having reference particularly to the main portion of the bed or bed-frame B it is seen that said frame is adapted to fold at the rear of frame A, as in Fig. 2, and to unfold into a horizontal position, as in Fig. 4. It is also seen that the bed has a rear supplementary or extension section B', adapted to fold and unfold with the bed B, also as seen in Figs. 2 and 4. This rear extension has such width as will bring up the full or total width of the bed to what is the accepted and popular width of a double bed and represents approximately one-fourth of the total width, more or less. The main portion or bed B therefore is adapted to be thrown or carried forward far enough to enable section B' to be raised and brought into horizontal position at its rear and on the same plane therewith, so as to make the two parts practically one and without seam or rib to disclose the line of union. To these ends the frame B is provided at its ends with rigid right-angled supporting-arms D, extending forward at or from the lower edge of said frame, Fig. 7, and provided with lugs or pins *d*, pivoted at about their angles on fixed bearings *a'* on frame A, Fig. 6, and upon which the bed-frame is turned up and down or from one position to another and rests at al times.

A suitable rail *d'* connects and strengthens the arms D at their base, and the frame B rests at its top against the top rail *a* of the frame A when up or folded. The arrangement and construction of the right-angled arms D is such as to carry the bed B forward at its bottom when folded, so as to give it an inclined position relatively, as in Fig. 2, in order to make room at its rear for the extension or supplemental section B', and this enables the said extension-section to be brought within the plane of the rear of main frame A and to bestow both parts within the confines of said frame and which is otherwise well within the proportions of a davenport-couch of a corresponding length. Hence there is nothing to betray or suggest the presence of a bed when the parts are folded for day use, as in Fig. 1, and the couch is well proportioned in height, length, and width.

Extension-section B' is provided with end hinges $b'$ at such point as not to interfere with the mattress of both sections or parts, and hence a uniform and unbroken sleeping-surface is afforded, as seen in Fig. 4, and the section B' is supported by hinges $b'$ at the same level from main frame B. Said section B' is adapted to fold flat against section B or the mattress thereon, as in Fig. 2, and to effect this change from its open position or to change it from one position to the other angle-iron guides G are provided at or upon the ends of frame A and on which rollers $b^2$ at the ends and edges of section B' are adapted to run. The said guides G have each a forwardly-curved arm $g$, on which the rollers $b^2$ rest when the bed is open, Fig. 4, and also on which said rollers run up and down as the changes are made from one position to the other. Thus assuming that the bed is to be folded the hinge-point $b'$ of section B' will travel on an arc from pivot $d$ on the line indicated by the arrow, Fig. 4, which will cause roller $b^2$ to run up on arm $g$ and follow along the vertical wall of the guide G somewhat above the junction of said arm, and then as the pivot or hinge $b'$ descends the rollers $b^2$ will travel along the vertical wall of guide G to the point shown in Fig. 2. The lowering of bed-frame B simply reverses these movements, and thus section B' of the bed is automatically opened and folded and requires no personal attention when the bed is raised or lowered. A lip $b^3$ acts with roller $b^2$ in its shifting travel on guides G.

The couch or sofa-seat C likewise is automatically raised and lowered with the tilting or turning of the bed to either direction, and said couch rests with its front edge rail $c$ on front rail $a^2$ of the main frame when in raised position and in notches $c'$ at its ends on rail $a^2$ when in lowered position to accommodate the bed, and it is actuated from the pivot-points $d^2$ from the top of arms D engaging the ends of the couch on the pivot irons or hooks $c^2$ on the ends of seat C, Fig. 7. It follows when the bed is lowered that couch-seat C is lowered also, and recesses $c'$ rest down over rail $a^2$, Fig. 4, and when the bed is raised the couch-seat is raised also and is supported at its front on rail $a^2$ and at its rear by arms D, Fig. 2. The ends of the couch have inclined edges $c^3$, sliding on rail $a^2$, and the forward and downward movement of the seat helps to tilt the bed. This, too, occurs automatically through the movements of bed-frame B, which is raised and lowered by hand, engaging with the top front portion thereof. At the top and front of frame or bed B there is also a hood H lengthwise thereof and hinged to or upon said frame and adapted to swing over the top of said frame when the bed is folded and which is upholstered or otherwise attractively finished to give the appearance of a roll or border which has a decorative effect, but which drops down out of the way when the bed is lowered for use, as in Fig. 4. Otherwise it overlaps the upper edge of the bed and rests at its top snugly against main frame A, as in Fig. 2, till the bed is to be lowered. Then it is swung forward on its hinges, and the top of frame B is exposed to be grasped by the hand. The bottom of bedframe B beneath its spring-mattress $l$ is specially cushioned and finished to form a suitable back L for the couch, and this part may be built up in any good mechanical way.

The head and foot rails or frames M and N are hinged on brackets $m'$ to fold down upon the bed and have end sections $m$ and $n$, respectively, at their rear, pivotally supported thereon and adapted to fold flat upon frames M and N when the bed is folded and to open out and become rigid with said end frames M and N when the bed is open, as in Fig. 4.

Brackets P, Fig. 10, are fixed upon the end of main frame B, and the folding end frames M and N are each provided at their outer lower corners with toothed segments $m^2$, which mesh with corresponding segments $o$, rigid with the upper ends of outer supporting-legs O. Pivots $m^3$ and $o'$, respectively, engage said segments with brackets P, and thus it occurs when one of the end frames is folded down, as at the left in Fig. 7, the leg O, operatively connected therewith, is folded up snugly at the side of frame B or the mattress thereon and is wholly out of the way. The same occurs at the other end under similar conditions.

The rear end sections $m$ and $n$ of the head and foot frames are free to be folded inward upon the said frames on the hinges or pivots $n^2$ after the entire end frame has been laid down, as in Fig. 7. This folding occurs at the same time with the inward folding of bed extension B'. The front portion $m^4$ and $n^4$ of the head and foot frames are rigid with the main frames M and N, and hence the legs O, connected therewith, fold where the main frames are folded.

The couch-seat C is so arranged as to be easily removed by lifting it off its supports on arms D, and the entire bed can be removed in like manner by simply lifting it from its supports $a$ and G.

When hood H is swung down, as in Fig. 4, it leaves the front edge of the bed free to sit upon like an ordinary bed, as there is no rail or other obstruction in front of the cushioned mattress, and when the end frames M and N are folded preparatory to raising the bed the bed may rest down upon the couch-seat temporarily.

If desired, suitable springs may be employed here and there to assist in raising and lowering the bed-frame.

Any suitable spring or mesh bottom may be used for the bed-frame sections B and B'.

The head and foot rails when unfolded and in raised position serve to rigidly lock the main bed-frame B and its extension B' in alinement and the extension cannot be folded until the rails are lowered.

A removable mattress R with an extension or connected portion R' is preferably used upon the spring-bottom $l$ and is adapted to fold with the bed-frame parts, and it is also designed that the bedding be also folded and be held in place by rails M and N.

What I claim is—

1. In a combined bed and couch, a main frame, a bed-frame provided with forwardly-projecting arms having pivot-lugs to engage said main frame to carry the bed-frame forward and upward to a normal elevation for use and to lower the rear side of the bed at the rear of the main frame when the bed is folded, and a bed extension hinged on the rear of the said bed-frame, and adapted to fold and unfold with the bed-frame.

2. In a combined bed and couch, a main frame, a bed-frame provided with fixed arms pivotally supported upon said main frame at the front of the bed-frame bottom and constructed to carry the bed forward and to raise the bed to a normal elevation when used, a bed extension hinged upon said bed-frame at its rear and bottom, and a fixed support upon the said main frame comprising a vertical and inclined track upon which said bed extension is supported and adapted to travel.

3. In a combined bed and couch, a main frame and a bed-frame, a bed extension hinged upon one edge of said bed-frame, and fixed guides upon the main frame for the rear edge of the said bed extension, said guides comprising vertical portions and forwardly-curved inclined portions.

4. In a combined bed and couch, a main frame and a bed-frame provided with supporting-arms having pivots at its front and keepers or rests upon said main frame, a bed extension hinged upon the lower rear edge of the said bed-frame and adapted to fold against the same, guideways at the ends of said main frame constructed to support the said bed extension at its rear when the bed is open and to serve as guides in folding and unfolding the same, and a couch-seat slidably supported on said main frame and pivotally and removably supported upon said bed-frame supporting-arms.

5. In a combined bed and couch, a main frame and a bed-frame pivotally supported therein having its bottom finished to form a back for the couch and a hinged hood at the top of said back constructed to swing over the top edge of the said bed-frame and forming a border for the top of the couch-back, folding head and foot frames mounted upon said bed-frame, and supporting-legs for the front of the bed-frame adapted to fold flush and parallel with the front rail of said bed-frame and adapted to be inclosed by said hood.

6. In a folding bed, a folding bed-frame and a support therefor, said frame comprising front and rear side sections hinged together and provided with a spring-bottom, and head and foot frames comprising jointed members hinged upon said front and rear sections.

7. A folding bed comprising a pair of sections pivotally connected and provided with a common spring-bottom, and separate end rails pivoted upon each section at each end and constructed to jointly fold and unfold with said sections.

8. In a combined bed and couch, a main frame and a bed-frame pivotally supported therein and a bed extension at the rear hinged to said bed-frame, in combination with folding head and foot frames upon said bed-frame and hinged extensions on said head and foot frames at the ends of said bed extension and adapted to be folded, substantially as described.

9. A davenport-sofa frame of standard size, in combination with a folding bed comprising a set of bed-frame sections having spring-bottoms and adapted to form a full-sized bed, said bed supported within said sofa-frame and said sections constructed to fold one upon the other within the rear portion of said sofa-frame, and a couch-seat slidably supported within the front portion of said sofa-frame, and pivotally and detachably connected with one of said bed-sections.

10. A davenport-sofa frame provided with a couch-seat, in combination with a folding bed constructed to unfold over said seat and comprising a set of sections provided with spring-bottoms to form a full-sized bed, said bed-sections movably supported upon said sofa-frame and constructed to fold one upon the other within the rear portion of said sofa-frame, and said couch-seat having a pivotal and detachable connection with one of said sections.

11. In a folding bed, a folding bed-frame comprising a main bed-bottom having a side extension from end to end hinged thereto and adapted to unfold to bring said extension and said bottom on the same plane, rigid right-angled arms fixed to the said main bed-bottom, a set of pivot members on each arm, a couch-seat removably engaged with one set of said pivot members and a main supporting-frame having open rests for the other set of said pivot members.

12. In a folding bed, a main frame and a bed-frame pivotally supported thereon, a bed extension hinged upon the rear of said bed-frame, a vertical guide provided with a forwardly-curved portion upon said main frame, and a roller and a lip upon said bed extension adapted to ride upon said guide and operate and support said bed extension.

13. In a folding bed, a main frame and a bed-frame pivoted thereon, head and foot rails pivotally mounted upon opposite ends of said bed-frame, a supporting-leg pivoted upon the front of said bed-frame at each end and gearing connecting each leg with the rails, and a hood extending across the front of said bed from end to end and hinged thereon and adapted to inclose said legs and rails when folded.

In testimony whereof I sign this specification in the presence of two witnesses.

DAVID T. OWEN.

Witnesses:
R. B. MOSER,
C. A. SELL.